Patented Feb. 22, 1938

2,109,165

UNITED STATES PATENT OFFICE 2,109,165

PROCESS OF PRESERVING RUBBER AND PRODUCT

Howard I. Cramer, Cuyahoga Falls, Ohio, assignor to Wingfoot Corporation, Wilmington, Del., a corporation of Delaware No Drawing. Application July 2, 1932, Serial No. 620,736

11 Claims. (Cl. 18—50)

This invention relates to a new class of age-resisting compounds suitable for incorporation in rubber as antioxidants. The substances comprising the class in question have been found to protect the rubber against deterioration from heat, light and oxygen and to materially enhance the resistance of the same to deterioration by flexing. In addition, they impart still other desirable properties to the product.

It has been known that the aryl naphthylamines exhibit age-resisting properties. It has not been known, however, that these substances on hydrogenation yield tetrahydro derivatives having similar age-resisting properties. This invention resides in the discovery that the secondary naphthylamines, when hydrogenated as herein disclosed, yield derivatives possessed of the power of resisting the effects of light, heat and oxygen and of enhancing the resistance to deterioration by flexing in the vulcanized products in which they are incorporated.

The compounds in question may be conveniently prepared by the catalytic hydrogenation under pressure of the secondary aryl amines. Preferably, pressures in the neighborhood of 100–200 atmospheres are employed, together with temperatures ranging from approximately 100° to approximately 150° C. In general, nickel catalysts may be employed to good advantage, although a chromite catalyst such as copper chromite may be employed at somewhat higher temperatures to give equally satisfactory results. In the case of such chromite catalysts temperatures ranging from approximately 250 to 300 degrees C. may be used.

In the preparation of these compounds, the hydrogen may be admitted under pressure to a receptacle containing the catalyst and the secondary aryl amine to be hydrogenated. If desired, the receptacle may be rocked or otherwise moved to agitate the contents, but it is also possible to pass the hydrogen continuously through the mixture to provide the desired agitation. The hydrogenation may be accomplished in a bomb or autoclave constructed to stand the pressures at which the reaction or reactions in question can be effected.

Customarily a mixture of approximately equal parts of two isomeric derivatives are obtained by hydrogenating the aryl secondary naphthylamines. In the case of phenyl beta naphthylamine, these are phenyl aromatic tetrahydro beta naphthylamine having the formula

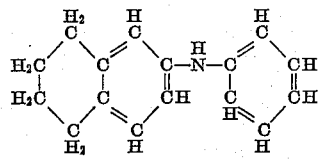

and phenyl alicyclic tetrahydro beta naphthylamine of the formula

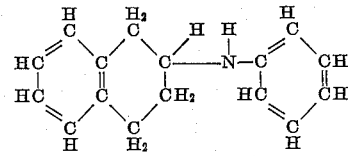

These isomers may be separated by fractional distillation in vacuum and may respectively be purified by further distillation.

The alicyclic tetrahydro beta naphthylamine derivative may be obtained as the sole product and in a very pure state by the hydrogenation under pressure approximating 180 to 200 atmospheres of the phenyl beta naphthylamine. In case the chromite catalyst above referred to is employed, this hydrogenation is best accomplished at 250 to 300 degrees C. Thus either of the two isomers hereinabove described or a mixture of the two of them may be obtained with a high degree of facility.

The following table gives data covering the yields, physical properties and analyses of the hydrogenation products of the phenyl beta naphthylamines and their hydrochlorides:

Table I

| Compound | Yield per cent | Physical properties | Analyses | | | |
|---|---|---|---|---|---|---|
| | | | Found | | Calc. | |
| | | | N | CL | N | CL |
| Mixture of ac and ar tetrahydro phenyl beta naphthylamine. | 92 | Paste M. P. about 40-50°. | | | | |
| Ac tetrahydro phenyl beta naphthylamine. | 40 | Liquid B. P. 175–80°/2–3 mm. | 6.20 | | 6.27 | |
| Ac tetrahydro phenyl beta naphthylamine hydrochloride. | | White solid M. P. 238–40°. | 5.11 | 13.62 | 5.39 | 13.65 |
| Ar tetrahydro phenyl beta naphthylamine. | 50 | White crystals M. P. 65–6°. | 6.02 | | 6.27 | |
| Ar tetrahydro phenyl beta naphthylamine hydrochloride. | | White solid M. P. 147–8°. | 5.46 | 13.60 | 5.39 | 13.65 |

It is apparent from the foregoing that these compounds are chemically distinct.

Conveniently these materials may be compounded in a stock having the following formula:

| | Parts |
|---|---|
| Extracted pale crepe | 100 |
| Zinc oxide | 5 |
| Sulfur | 3 |
| Hexamethylene tetramine | 1 |
| Stearic acid | 1.5 |
| Antioxidant | 1.0 |

The results obtained using this formula are given in the following table:

Table II

| Cure | Original | | | | 6 Days at 50° C. and 150#/in². Aged in oxygen bomb | | | | | |
|---|---|---|---|---|---|---|---|---|---|---|
| | Tens. | Elg. | 500% | 700% | Tens. | Elong. | 500% | 700% | Percent wt. inc. | Tensile ratio |
| Mixture of phenyl ar and ac tetrahydro naphthylamines | | | | | | | | | | |
| | | | | | | | | | | Percent |
| 35/285 | 112 | 905 | 12 | 35 | 113 | 840 | 15 | 50 | .04 | |
| 50 | 136 | 850 | 17 | 57 | 130 | 795 | 20 | 75 | .13 | 96 |
| 70 | 154 | 810 | 21 | 79 | 145 | 755 | 25 | 105 | .25 | |
| Phenyl ar tetrahydro beta naphthylamine | | | | | | | | | | |
| 35/285 | 94 | 865 | 13 | 37 | 70 | 810 | 11 | 37 | .11 | |
| 50 | 123 | 845 | 16 | 50 | 102 | 800 | 15 | 53 | .19 | 78 |
| 70 | 142 | 800 | 20 | 73 | 110 | 755 | 21 | 78 | .33 | |
| Phenyl ac tetrahydro beta naphthylamine | | | | | | | | | | |
| 35/285 | 109 | 835 | 15 | 49 | 80 | 785 | 15 | 49 | .08 | |
| 50 | 105 | 815 | 15 | 52 | 98 | 785 | 15 | 58 | .22 | 82 |
| 70 | 141 | 780 | 22 | 83 | 114 | 745 | 23 | 88 | .18 | |

These data show the results obtained in the low temperature ageing test.

For the high temperature test, a somewhat different stock may be employed. Thus in the experiments recorded in Table III, the following formula is used:

| | Parts |
|---|---|
| Smoked sheet | 100 |
| Zinc oxide | 92.6 |
| Carbon black | 0.6 |
| Ferric oxide | 0.8 |
| Sulfur | 3.5 |
| Diphenylguanidine | 0.7 |
| Antioxidants | 5.0 |

The value of these compounds is shown in table III, in which the results of the high temperature antioxidant test on phenyl ar tetrahydro beta naphthylamine and phenyl alicyclic tetrahydro beta naphthylamine are recorded.

Table III

| Cure | Original | | | | Aged 7 hrs. in air bomb 80#/114 | | | | |
|---|---|---|---|---|---|---|---|---|---|
| | Tens. | Elong. | 500% | 700% | Tens. | Elong. | 300% | 500% | Tens. ratio |
| Phenyl ar tetrahydro beta naphthylamine | | | | | | | | | |
| | | | | | | | | | Percent |
| 35/285 | 143 | 640 | 25 | 74 | 65 | 605 | 18 | 43 | |
| 50 | 184 | 660 | 31 | 90 | 81 | 580 | 24 | 58 | 45 |
| 70 | 202 | 640 | 38 | 108 | 96 | 595 | 29 | 68 | |
| Phenyl ac tetrahydro beta naphthylamine | | | | | | | | | |
| 35/285 | 157 | 655 | 27 | 78 | 74 | 610 | 20 | 48 | |
| 50 | 186 | 665 | 32 | 91 | 93 | 605 | 25 | 62 | 50 |
| 70 | 211 | 655 | 40 | 110 | 114 | 605 | 31 | 75 | |

For the purpose of testing tread cracking characteristics of a stock employing these accelerators, the following formula was used:

| | Parts |
|---|---|
| Smoked sheet | 100 |
| Zinc oxide | 5.5 |
| Carbon black | 43.0 |
| Sulphur | 2.75 |
| Stearic acid | 4.0 |
| Pine tar | 5.7 |
| Antioxidant | 1.0 |

Mercaptobenzothiazole in small amount

Table IV shows the results obtained in a flexing machine.

Table IV

| Compound | Amt. accelerator | Flex Life—Hours | |
|---|---|---|---|
| | | 70″ cure | 140″ cure |
| Mixture phenyl ac and ar tetrahydro beta naphthylamine | 1.00 | 5.70 | 6.60 |
| Phenyl ar tetrahydro beta naphthylamine | 1.35 | 6.20 | 7.60 |
| Phenyl ac tetrahydro beta naphthylamine | .75 | 6.55 | 7.05 |

In these tests, the stocks were prepared with varying amounts of accelerator in order to ascertain the optimum cure at 70 minutes. A stock containing no antioxidant whatsoever averaged about four hours of flexing before failure occurred, whereas the other stocks showed increases in flex life approximating and even exceeding 50% of that figure. The data given in Table IV is the average of the flex life of sixteen test strips for each cure.

While the phenyl beta naphthylamines have been used herein as illustrative of the invention, it is obvious that numerous related compounds may be used instead. Thus phenyl alpha naphthylamine may be employed, as may also tolyl alpha naphthylamine, tolyl beta naphthylamine, xylyl alpha naphthylamine, xylyl beta naphthylamine and others. Compounds obtained will vary according to the secondary amine which is hydrogenated, although in general mixed ar tetrahydro naphthylamines and ac-tetrahydro naphthylamines are obtained.

Compounds which can be prepared by this method are xylyl ar-tetrahydro naphthylamines, alpha or beta; xylyl ac-tetrahydro naphthylamines, alpha or beta; cumidyl ar-tetrahydro naphthylamines, alpha or beta; cumidyl ac-tetrahydro naphthylamines, alpha or beta; ortho tolyl ar-tetrahydro alpha and beta naphthylamines, ortho tolyl ac-tetrahydro alpha and beta naphthylamines, para tolyl ar-tetrahydro alpha and beta naphthylamines, para tolyl ac-tetrahydro alpha and beta naphthylamines, alpha naphthyl ar-tetrahydro naphthylamines, alpha or beta; alpha naphthyl ac-tetrahydro naphthylamines, alpha or beta; beta naphthyl ar-tetrahydro naphthylamines, alpha or beta; beta naphthyl ac-tetrahydro naphthylamines, alpha or beta; di ar-tetrahydro beta naphthylamine; di ar-tetrahydro alpha naphthylamine; di ac-tetrahydro alpha naphthylamine, di ac-tetrahydro beta naphthylamine; ar-tetrahydro naphthyl ac-tetrahydro beta naphthylamine; ar-tetrahydro ac-naphthyl tetrahydro alpha naphthylamine, and others. A wide variety of homologues corresponding to these various compounds may be similarly prepared, such homologues including amines having in place of the naphthyl substituent other organic groups.

From the foregoing it is apparent that the compounds herein disclosed are highly suitable for antioxidants in rubber and other products which deteriorate under the influence of heat, light and oxygen. Not only do these compounds counteract the effect of such agencies, but they tend to impart highly desirable qualities such, for example, as the increase in flexing power referred to. It will be apparent that numerous changes may be made in the procedure to be followed and the chemicals employed without departing from the inventive concept. It is intended that the patent shall cover, by suitable expression in the appended claims, whatever features of patentable novelty reside in the invention.

What I claim is:

1. A rubber composition including a phenyl beta tetra hydro naphthylamine.
2. A rubber composition including phenyl ar tetra hydro beta naphthylamine.
3. A rubber composition including phenyl alicyclic tetra hydro beta naphthylamine.
4. A rubber composition including an aryl tetra hydro naphthylamine.
5. A rubber composition including a cyclic tetra hydro naphthylamine.
6. A process of treating rubber which comprises incorporating therein phenyl beta tetra hydro naphthylamine.
7. The process of treating rubber which comprises incorporating therein an aryl tetra hydro naphthylamine.
8. The process of treating rubber which comprises incorporating therein a cyclic tetra hydro naphthylamine.
9. A rubber composition including phenyl beta tetra-hydro naphthylamine.
10. A process of treating rubber which comprises incorporating therein phenyl ar-tetrahydro beta naphthylamine.
11. A process of treating rubber which comprises incorporating therein phenyl ac-tetrahydro beta naphthylamine.

HOWARD I. CRAMER.